(12) United States Patent
Park et al.

(10) Patent No.: US 8,860,918 B2
(45) Date of Patent: Oct. 14, 2014

(54) LIQUID CRYSTAL DISPLAY DEVICE HAVING NARROW BLACK MATRIX

(75) Inventors: Ji-Ryun Park, Yongin (KR); Sang-Woo Park, Yongin (KR); Sun-Kyo Jung, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 402 days.

(21) Appl. No.: 13/025,297

(22) Filed: Feb. 11, 2011

(65) Prior Publication Data

US 2011/0285944 A1  Nov. 24, 2011

(30) Foreign Application Priority Data

May 24, 2010 (KR) .................. 10-2010-0048186

(51) Int. Cl.
| | | |
|---|---|---|
| *G02F 1/1345* | (2006.01) | |
| *G02F 1/1333* | (2006.01) | |
| *G02F 1/1343* | (2006.01) | |
| *G02F 1/1339* | (2006.01) | |
| *G02F 1/1335* | (2006.01) | |

(52) U.S. Cl.
CPC ............ *G02F 1/1345* (2013.01); *G02F 1/1339* (2013.01); *G02F 2203/01* (2013.01); *G02F 1/133512* (2013.01)
USPC ............ 349/149; 349/110; 349/139; 349/153

(58) Field of Classification Search
CPC . G02F 1/1339; G02F 1/1345; G02F 1/13452; G02F 1/13454; G02F 1/13458; G02F 2001/133388
USPC .......... 349/110, 111, 138, 139, 147, 149–153
See application file for complete search history.

(56) References Cited

U.S. PATENT DOCUMENTS

| | | | |
|---|---|---|---|
| 6,424,401 B1 * | 7/2002 | Kang et al. .................... | 349/153 |
| 6,737,289 B2 * | 5/2004 | Woo et al. ....................... | 438/30 |

(Continued)

FOREIGN PATENT DOCUMENTS

| | | |
|---|---|---|
| JP | 06-160904 | 6/1994 |
| JP | 2002-110343 | 4/2002 |

(Continued)

OTHER PUBLICATIONS

Korean Office Action issued by Korean Intellectual Property Office on Aug. 16, 2011 in the corresponding Korean Application No. KR10-2010-0048186 with English translation attached herewith. Previously submitted on Nov. 10, 2011 with a Request for Entry.

*Primary Examiner* — Bumsuk Won
*Assistant Examiner* — Paisley L Arendt
(74) *Attorney, Agent, or Firm* — Robert E. Bushnell, Esq.

(57) ABSTRACT

A liquid crystal display device has a narrow black matrix located outside an effective display region. The device includes a first substrate, a second substrate, first conduction lines spaced apart from each other on a surface of the first substrate facing the second substrate, a first insulating layer covering the first conduction lines, second conduction lines spaced apart from each other on the first insulating layer and formed in regions corresponding to intervals of the first conduction lines, a second insulating layer covering the second conduction line, a sealant interposed between the second insulating layer and the second substrate and overlapping at least a portion of the first and second conduction lines, and a black matrix interposed between the second substrate and the sealant and overlapping the first and second conduction lines and the sealant. At least one kind of conduction lines is formed of a transparent conductive material.

4 Claims, 3 Drawing Sheets

(56) References Cited

U.S. PATENT DOCUMENTS

| | | |
|---|---|---|
| 7,221,425 B2 * | 5/2007 | Jung et al. .................... 349/149 |
| 7,439,086 B2 | 10/2008 | Yamazaki et al. |
| 7,643,123 B2 | 1/2010 | Baek et al. |
| 7,889,308 B2 | 2/2011 | Jeong |
| 2007/0085938 A1 | 4/2007 | Yamazaki et al. |
| 2007/0177073 A1 | 8/2007 | Seo et al. |
| 2009/0251653 A1 * | 10/2009 | Hayashi ....................... 349/139 |
| 2010/0002180 A1 * | 1/2010 | Kim et al. .................... 349/143 |
| 2010/0085526 A1 * | 4/2010 | Chen et al. .................... 349/152 |

FOREIGN PATENT DOCUMENTS

| | | |
|---|---|---|
| KR | 10-0544123 | 1/2006 |
| KR | 10-0612790 | 8/2006 |
| KR | 10-2007-015075 | 2/2007 |
| KR | 10-2008-0003226 A | 1/2008 |

\* cited by examiner

LIQUID CRYSTAL DISPLAY DEVICE HAVING NARROW BLACK MATRIX

CLAIM OF PRIORITY

This application makes reference to, incorporates the same herein, and claims all benefits accruing under 35 U.S.C. §119 from an application earlier filed in the Korean Intellectual Property Office on the 24 May 2010 and there duly assigned Serial No. 10-2010-0048186.

BACKGROUND OF THE INVENTION

1. Field of the Invention

The present invention relates to a liquid crystal display device and, in particular, a liquid crystal display device having a narrow black matrix.

2. Description of the Related Art

Liquid crystal display devices are often used in monitors for notebooks and desktop computers due to their high resolution, excellent color display characteristics, and high image quality.

Liquid crystal display devices include pixels, each including a thin film transistor, and data and scan drivers for driving the thin film transistors.

In liquid crystal display devices, a region other than the image display region is shielded by a black matrix so as not to be viewed from the outside.

However, recently, the demand for a panel having a larger effective display region for embodying an image and a smaller black matrix region has increased.

SUMMARY OF THE INVENTION

The present invention comprises a liquid crystal display device having a narrow black matrix located outside an effective display region.

Additional aspects of the invention are set forth, in part, in the description which follows and, in part, will be apparent from the description, or may be learned by practice of the presented embodiments.

According to the present invention, a liquid crystal display device comprises: a first substrate; a second substrate facing the first substrate; a plurality of first conduction lines which are spaced apart from each other on a surface of the first substrate which faces the second substrate; a first insulating layer which covers the first conduction lines and is formed on the first substrate; a plurality of second conduction lines which are spaced apart from each other on the first insulating layer and are formed in regions corresponding to intervals of the first conduction lines; a second insulating layer which covers the second conduction lines and is formed on the first insulating layer; a sealant which is interposed between the second insulating layer and the second substrate, forms a closed loop along edges of the first substrate and the second substrate, and overlaps at least a portion of the first conduction lines and the second conduction lines; and a black matrix which is interposed between the second substrate and the sealant, and overlaps the first conduction lines, the second conduction lines, and the sealant; wherein at least one kind of conduction lines selected from the group consisting of first conduction lines and second conduction lines is formed of a transparent conductive material.

The transparent conductive material includes indium tin oxide (ITO), indium zinc oxide (IZO), zinc oxide (ZnO), or indium oxide ($In_2O_3$).

The type of conduction lines selected from the group consisting of first conduction lines and second conduction lines includes a transparent conductive material, and the other type of conduction lines includes a non-transparent conductive material.

The non-transparent conductive material includes aluminum.

In the liquid crystal display device, a width of each of the conduction lines including the transparent conductive material is greater than a width of each of the conduction lines including non-transparent conductive material.

The first conduction lines do not overlap the second conduction lines.

The first conduction lines overlap the second conduction lines, and a width of an overlapping region of the first conduction lines and the second conduction lines is equal to or less than one-half of a width of any one kind of connection lines selected from the group consisting of the first conduction lines and the second conduction lines.

According to a further embodiment of the present invention, a liquid crystal display device comprises: a first substrate; a second substrate facing the first substrate; a sealant which is interposed between the first substrate and the second substrate, and forms a closed loop along edges of the first substrate and the second substrate; a plurality of first conduction lines which are interposed between the first substrate and the sealant and are spaced apart from each other; a plurality of second conduction lines which are interposed between the first substrate and the sealant, are spaced apart from each other, and are located in a different plane from where the first conduction lines are arranged; and a black box which is interposed between the second substrate and the sealant and overlaps the first conduction lines, the second conduction lines, and the sealant.

The second conduction lines comprise indium tin oxide (ITO), indium zinc oxide (IZO), zinc oxide (ZnO), or indium oxide ($In_2O_3$).

The first conduction lines comprise a transparent conductive material.

The first conduction lines comprise indium tin oxide (ITO), indium zinc oxide (IZO), zinc oxide (ZnO), or indium oxide ($In_2O_3$).

The first conduction lines comprise a non-transparent conductive material.

The non-transparent conductive material includes aluminum.

In the liquid crystal display device, a width of each of the second conduction lines is greater than a width of each of the first conduction lines.

The first conduction lines do not overlap the second conduction lines.

The first conduction lines overlap the second conduction lines, and a width of an overlapping region of the first conduction lines and the second conduction lines is equal to or less than one-half of a width of any one kind of connection lines selected from the group consisting of the first conduction lines and the second conduction lines.

In addition, even when conduction lines which form an interconnection line are arranged in a plurality of planes and the conduction lines overlap a sealant, the sealant may be cured by exposure to ultraviolet (UV) rays and a decrease in a degree of the sealant curing may be prevented. Thus, the width of the black matrix may be further reduced.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
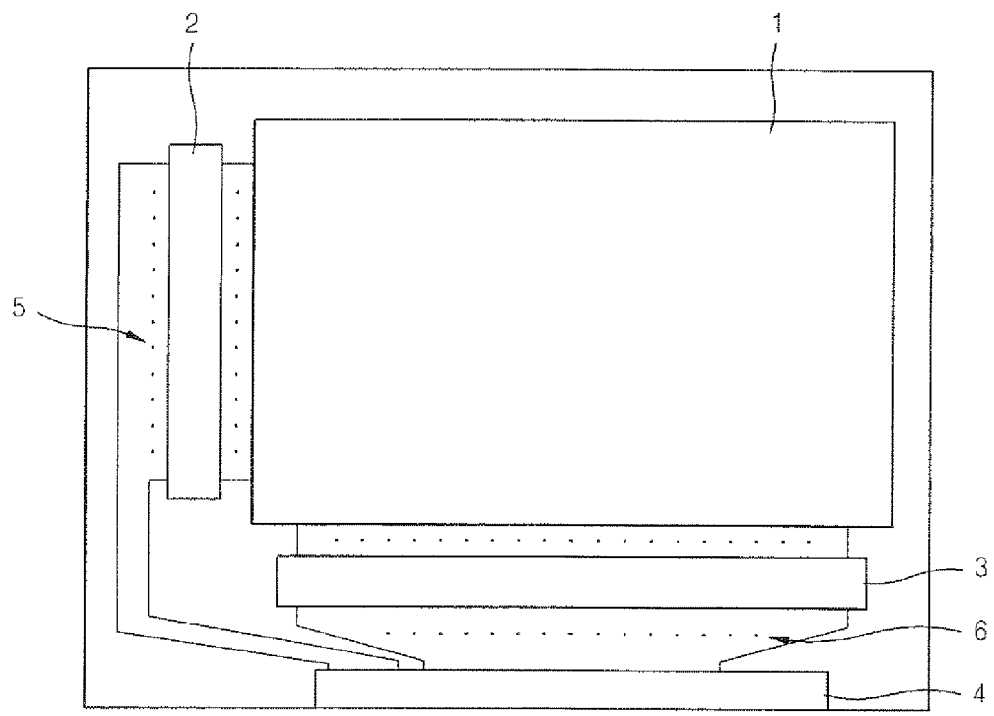
FIG. 1 is a schematic view of a liquid crystal display device according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

FIG. 1 is a schematic view of a liquid crystal display device according to an embodiment of the present invention.

Referring to FIG. 1, the liquid crystal display device according to the present embodiment includes a display unit 1 which corresponds to an effective display region, a scan driver 2 for providing a scan signal to the display unit 1, and a data driver 3 for providing a data signal to the display unit 1, wherein the scan driver 2 and the data driver 3 are located outside the display unit 1.

A pad unit 4 is also located outside the display unit 1, and the scan driver 2 is electrically connected to the pad unit 4 through first interconnection lines 5, and the data driver 3 is electrically connected to the pad unit 4 through second interconnection lines 6. Although not illustrated in FIG. 1, the liquid crystal display device may further include, in addition to the scan driver 2 and the data driver 3, a timing controller (not shown) for controlling the scan driver 2 and the data driver 3, and a common voltage generation unit (not shown) for supplying a common voltage (Vcom), which is a reference voltage, to the display unit 1. Each of the timing controller and the common voltage generation unit may also be connected to the pad unit 4 through separate interconnection lines (not shown).

In a liquid crystal display device having the structure described above, a region other than the effective display region corresponding to the display unit 1 is shielded by a black matrix. Accordingly, an image displayed by the display unit 1 does not leak out to the outside of the display unit 1, and a user may not recognize other conduction patterns located outside the display unit 1.

Figure 2:
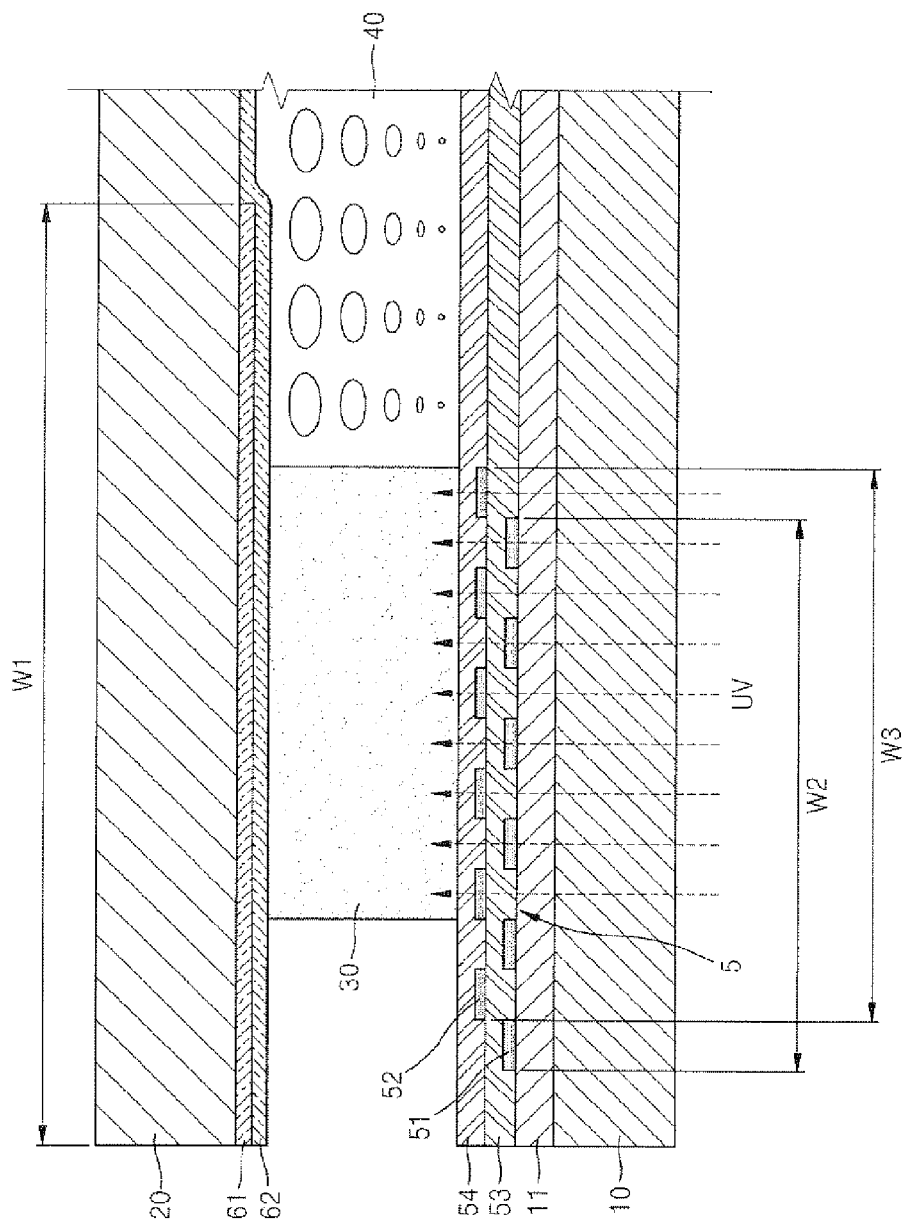
FIG. 2 is an enlarged cross-sectional view of a portion of the liquid crystal display device of FIG. 1 through which first interconnection lines pass according to an embodiment of the present invention.

FIG. 2 is an enlarged cross-sectional view of a portion of the liquid crystal display device of FIG. 1 through which the first interconnection lines pass according to an embodiment of the present invention.

In the liquid crystal display device, a first substrate 10 faces a second substrate 20, and the first substrate 10 is coupled to the second substrate 20 by a sealant 30. A space which is formed by coupling the first substrate 10 to the second substrate 20 by means of the sealant 30 is filled with liquid crystals 40.

A buffer layer 11 is formed on a surface of the first substrate 10 which faces the second substrate 20, and first conduction lines 51 and second conduction lines 52 are located on the buffer layer 11. That is, first conduction lines 51 are spaced apart from each other on the buffer layer 11, a first insulating layer 53 covers the first conduction lines 51, and second conduction lines 52 are disposed on the first insulating layer 53 and are spaced apart from each other. The first conduction lines 51 and the second conduction lines 52 are arranged on different planes and form the first interconnection lines 5 of FIG. 1. The second conduction lines 52 are formed in regions corresponding to intervals between the first conduction lines 51. A second insulating layer 54 may be further formed on the first insulating layer 53, the second insulating layer 54 covering the second conduction lines 52. Hereinafter, an embodiment will be described with reference to the first interconnection lines 5. However, the present invention is not limited thereto, and the same description may also apply to the second interconnection lines 6 of FIG. 1 or interconnection lines which contact a timing controller or a common voltage generation unit. In addition, although in the present embodiment, both the first conduction lines 51 and the second conduction lines 52 constitute the first interconnection lines 5, the present invention is not limited thereto. For example, the first conduction lines 51 and the second conduction lines 52 may constitute different interconnection lines.

A black matrix 61 is formed on a surface of the second substrate 20 which faces the first substrate 10. The black matrix 61 is formed of a light-absorbing material. The black matrix 61 is covered by a third insulating layer 62.

In another embodiment, the second insulating layer 54 and the third insulating layer 62 may not be formed.

The first substrate 10 and the second substrate 20 are coupled by the sealant 30. The sealant 30 may be formed close to edges of the first substrate 10 and the second substrate 20 and, although not illustrated, the sealant 30 may form a closed loop which allows liquid crystals 40 to remain inside the closed loop.

In accordance with the structure described above, the sealant 30 is interposed between the second insulating layer 54 and the third insulating layer 62 so as to fix the first substrate 10 and the second substrate 20. However, the present invention is not limited to that structure. For example, according to another embodiment, the second insulating layer 54 and/or the third insulating layer 62 are not formed, and the sealant 30 is interposed between the first insulating layer 53 (formed over the second conduction lines 52) and the black matrix 61.

In a liquid crystal display device having the structure described above, according to an embodiment of the present invention, the black matrix 61 may have a width W1 so that the black matrix 61 and the sealant 30 overlap each other. The black matrix 61 may also overlap the first conduction lines 51 and the second conduction lines 52. Accordingly, a user on the second substrate 20 side may not view the sealant 30, the first conduction lines 51, and the second conduction lines 52, and an image leakage into a region other than the effective display region may be prevented.

According to the present invention, in order to minimize the region other than the effective display region shielded by the black matrix 61 and to minimize a width W1 of the black matrix 61, conduction lines which form the same interconnection lines, such as the first conduction lines 51 or the second conduction lines 52, are disposed in different planes.

In addition, the first conduction lines 51 and the second conduction lines 52 at least partially overlap the sealant 30.

Accordingly, the width of the black matrix 61 may be reduced by the overlapping region of the first conduction lines 51 and second conduction line 52 and the sealant 30.

The sealant 30 is cured by exposure to ultraviolet (UV) rays. For example, as illustrated in FIG. 2, UV rays are irradiated from under the first substrate 10 to cure the second substrate 20, since the black matrix 61 is formed on the second substrate 20, and thus it may be difficult for UV rays to be transmitted through the second substrate 20.

In this regard, however, since the sealant 30 overlaps the first conduction lines 51 and the second conduction lines 52, if UV rays are less transmitted due to the first conduction lines 51 and the second conduction lines 52, the sealant 30 may be less cured correspondingly.

In order to solve this problem, at least one kind of conduction lines selected from the group consisting of the first conduction lines 51 and the second conduction lines 52 are formed of a transparent conductive material. Referring to FIG. 2, the first conduction lines 51 are formed of a transparent conductive material and the second conduction lines 52 are formed of a non-transparent conductive material. Alternatively, the first conduction lines 51 are formed of a non-transparent conductive material and the second conduction lines 52 are formed of a transparent conductive material. As a further alternative, both the first conduction lines 51 and the second conduction lines 52 are formed of a transparent conductive material.

The transparent conductive material may be indium tin oxide (ITO), indium zinc oxide (IZO), zinc oxide (ZnO), or indium oxide ($In_2O_3$), and the non-transparent conductive material may form a mono-layer or multiple-layer conductive structure which includes aluminum.

Figure 3:
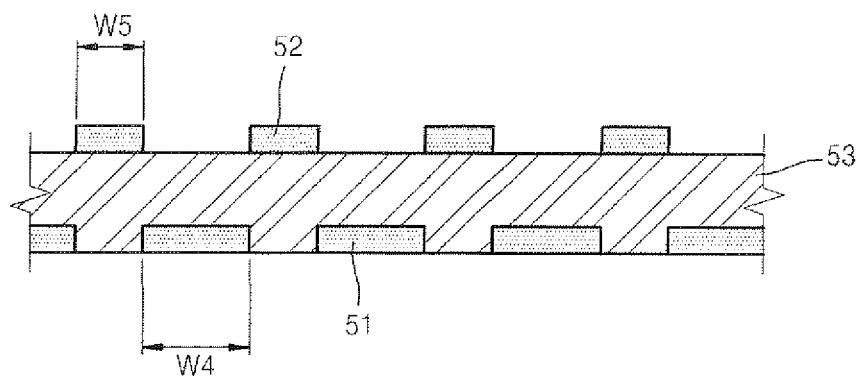
FIG. 3 is a cross-sectional view of first conduction lines and second conduction lines illustrated in FIG. 2 according to another embodiment of the present invention.

FIG. 3 is a cross-sectional view of first conduction lines and second conduction lines illustrated in FIG. 2 according to another embodiment of the present invention.

If any one kind of conduction lines selected from the group consisting of the first conduction lines 51 and the second conduction lines 52 is formed of a transparent conductive material and the other kinds of conduction lines are formed of a non-transparent conductive material, for example, as illustrated in FIG. 3, the first conduction lines 51 are each formed of a transparent conductive material and the second conduction lines 52 are each formed of a non-transparent conductive material, a width W4 of each of the first conduction lines 51 formed of a transparent conductive material may be greater than a width W5 of each of the second conduction lines 52 formed of anon-transparent conductive material. Therefore, UV transmittance against the transparent conductive material is increased, and the resistance of the transparent conductive material, which generally has a higher resistance than the non-transparent conductive material, is reduced.

Due to the structure described above, even when the sealant 30 overlaps the first conduction lines 51 and the second conduction lines 52, UV rays may be sufficiently irradiated onto the sealant 30, and thus the sealant 30 may be sufficiently cured.

In order for UV rays to be transmitted, intervals of the first conduction lines 51 and intervals of the second conduction lines 52 may be reduced, and correspondingly a width W2 (see FIG. 1) between the outermost first conduction lines 51 and a width W3 between the outermost second conduction lines 52 may be reduced, and thus a width W1 of the black matrix 61 may be reduced.

As illustrated in FIGS. 2 and 3, each of the first conduction lines 51 and each of the second conduction lines 52 may not overlap each other. When each of the first conduction lines 51 and each of the second conduction lines 52 do overlap each other, a parasitic capacitance may be formed between each of the first conduction lines 51 and each of the second conduction lines 52.

However, even when each of the first conduction lines 51 and each of the second conduction lines 52 overlap each other, as long as the overlapping region is just a portion of each of the first and second conduction lines 51 and 52, respectively, the formation of the parasitic capacitance may not be problematic. Rather, the width W2 of a region in which all the first conduction lines 51 are formed and the width W3 of a region in which all the second conduction lines 52 are formed may be further reduced, and correspondingly the width W1 of the black matrix 61 may be also be reduced.

Figure 4:
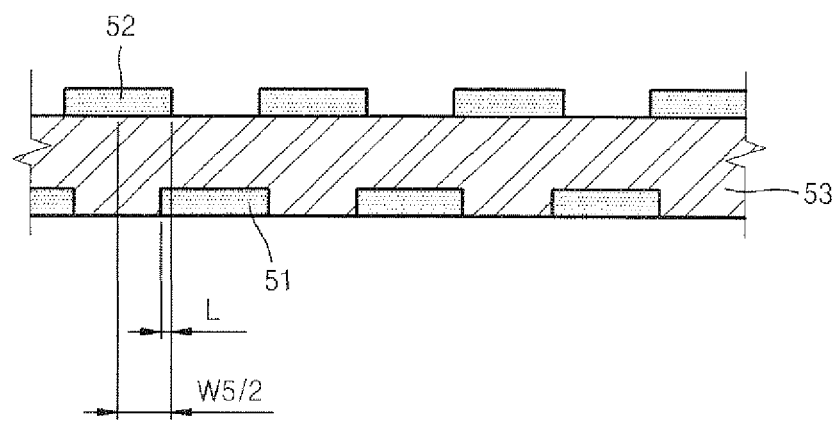
FIG. 4 is a cross-sectional view of first conduction lines and second conduction lines illustrated in FIG. 2 according to another embodiment of the present invention.

For example, FIG. 4 is a cross-sectional view of first conduction lines and second conduction lines illustrated in FIG. 2 according to another embodiment of the present invention.

As illustrated in FIG. 4, when each of the first conduction lines 51 and each of the second conduction lines 52 overlap each other, a width L of the overlapping region may be equal to or smaller than one-half of a width W5 of each of the second conduction lines 52.

Hereinbefore, the present invention has been described with reference to two-layer conduction lines. However, the present invention is not limited thereto, and the same description may apply to three-layer or four-layer conduction lines.

As described above, according to the one or more of the above embodiments of the present invention, a width of a black matrix which shields a region other than an effective display region may be reduced.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A liquid crystal display device, comprising:
a first substrate;
a second substrate facing the first substrate;
a sealant interposed between the first substrate and the second substrate, and forming a closed loop along edges of the first substrate and the second substrate;
a plurality of first conduction lines being formed of a transparent conductive material, interposed between the first substrate and the sealant and spaced apart from each other;
a plurality of second conduction lines being formed of a transparent conductive material, interposed between the first substrate and the sealant, spaced apart from each other, and located in a different plane from a plane where the first conduction lines are arranged, the sealant overlapping at least a portion of the first conduction lines and the second conduction lines; and
a black matrix interposed between the second substrate and the sealant and overlapping the first conduction lines, the second conduction lines and the sealant,
any portion of the first conduction lines and the second conduction lines, which is overlapped by the sealant, being formed of a transparent conductive material and not in direct contact with a non-transparent conductive material.

2. The liquid crystal display device of claim 1, wherein the transparent conductive material comprises one of indium tin oxide (ITO), indium zinc oxide (IZO), zinc oxide (ZnO), and indium oxide ($In_2O_3$).

3. The liquid crystal display device of claim 1, wherein the first conduction lines do not overlap the second conduction lines.

4. The liquid crystal display device of claim 1, wherein the first conduction lines overlap the second conduction lines, and a width of an overlapping region of the first conduction lines and the second conduction lines is not greater than one-half of a width of any one kind of connection lines selected from the group consisting of the first conduction lines and the second conduction lines.

* * * * *